Aug. 12, 1958

G. A. SCHURMAN 2,847,655

LOGGING DEVICE

Filed Dec. 28, 1954

INVENTOR
GLENN A. SCHURMAN
BY
ATTORNEYS

Aug. 12, 1958 G. A. SCHURMAN 2,847,655
LOGGING DEVICE
Filed Dec. 28, 1954 2 Sheets-Sheet 2

INVENTOR
GLENN A. SCHURMAN
BY
ATTORNEYS

United States Patent Office 2,847,655
Patented Aug. 12, 1958

2,847,655
LOGGING DEVICE

Glenn A. Schurman, Whittier, Calif., assignor to California Research Corporation, San Francisco, Calif., a corporation of Delaware Application December 28, 1954, Serial No. 478,147

3 Claims. (Cl. 340—18)

My invention relates to a deep well logging tool and particularly to a means for introducing electrical conductors into a logging device which is supported on a spring.

A seismic energy detector, or seismometer, may be used in obtaining a velocity log of a well. To obtain such a log, a charge of explosive is detonated near the mouth of the well and the seismic signal from the explosive is detected by a logging tool within the well. The signal generated by the logging tool is transmitted through a supporting cable to the surface where the duration of time between the detonation of the explosive and the arrival of the seismic wave at the logging tool is determined. The cable which supports the logging tool is normally constructed of high tensile strength steel and also contains the electrical conductors. The acoustic velocity in the cable is ordinarily greater than that of the formation surrounding the well. Accordingly, a large portion of the seismic energy tends to flow down the cable to the detector. The record of the arrival of this energy at the detector is termed the cable break. The cable break ordinarily involves much more energy than does the signal passing through the formation, the first break, which is the event to be timed on the record. If the cable break arrives near the time of the first breaks, the operator may be unable accurately to time the first breaks. Accordingly, it has become the practice to use a cable break isolator, a coupling between the logging tool and the supporting cable which attenuates the energy transferred between the cable and the logging tool. Such a cable break isolator may be a soft spring which absorbs cable-borne energy.

The use of such a spring introduces problems with relation to the electrical coupling between the cable and the seismometer or other logging tool. In prior art devices of which I am aware, the conductors have been placed in the same housing with the spring and an effort has been made to seal the housing so that it prevents the flow of well fluids and debris into contact with the spring. Such an arrangement is highly expensive and is difficult to make water-tight inasmuch as it must be sufficiently flexible to permit flexure of the spring. For example, bellows or similar arrangements having adequate flexibility are ordinarily so fragile as to be subject to frequent damage and introduce a maintenance problem.

Alternatively, the spring housing has been left open in prior logging arrangements. The electrical conductor is placed adjacent the springs and has sufficient slack to permit elongation of the spring without putting tension on the electrical conductors. Such an arrangement denies the insulated electrical conductors the protection of a housing and subjects them to the pinching action of the spring and to the abrasion and damage from chips which are free to enter the spring chamber.

Thus, it is seen that efforts to protect the electrical conductors in the cable break isolator ordinarily introduce maintenance problems that lead to lost time at the well site. According to my invention, the problem of protecting the electrical conductors without interfering with the operation of the cable break isolator is solved by using the cable break isolator spring wire itself as a protection for the electrical conductors. The cable break isolator spring is a steel tube containing a pair of insulated conductors. The conductors are contained within hollow tubing between the supporting cable and the isolator spring.

Further objects and advantages of my invention will become apparent from the following detailed description read in connection with the accompanying drawings, in which.

Figure 1:
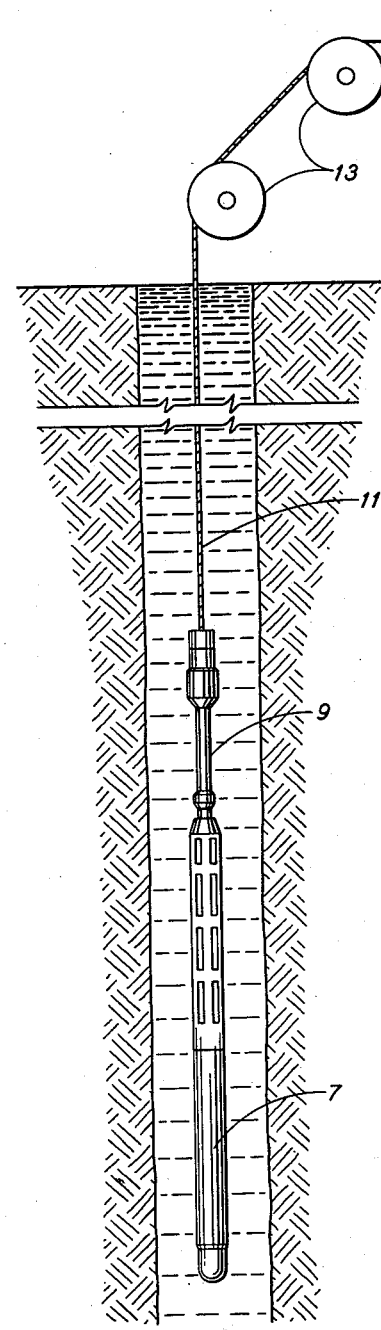
Fig. 1 shows schematically a seismometer in a well.
Figure 5:
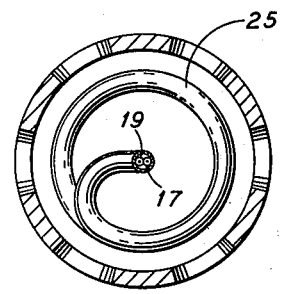
Figure 2A:
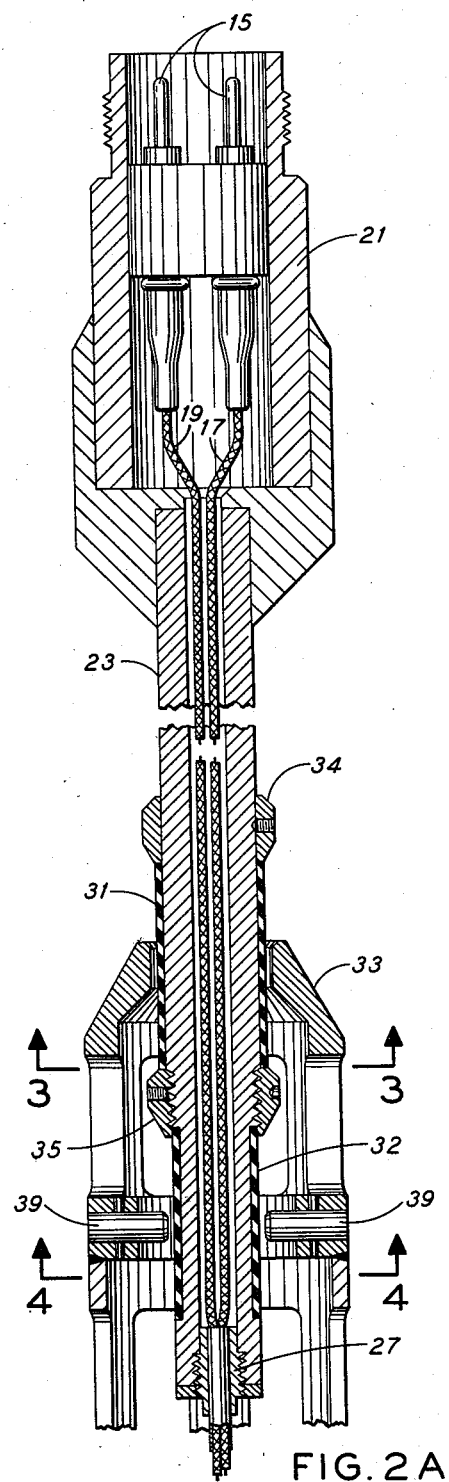
Figs. 2A and 2B are a drawing of a cable break isolator according to my invention.
Figure 2B:
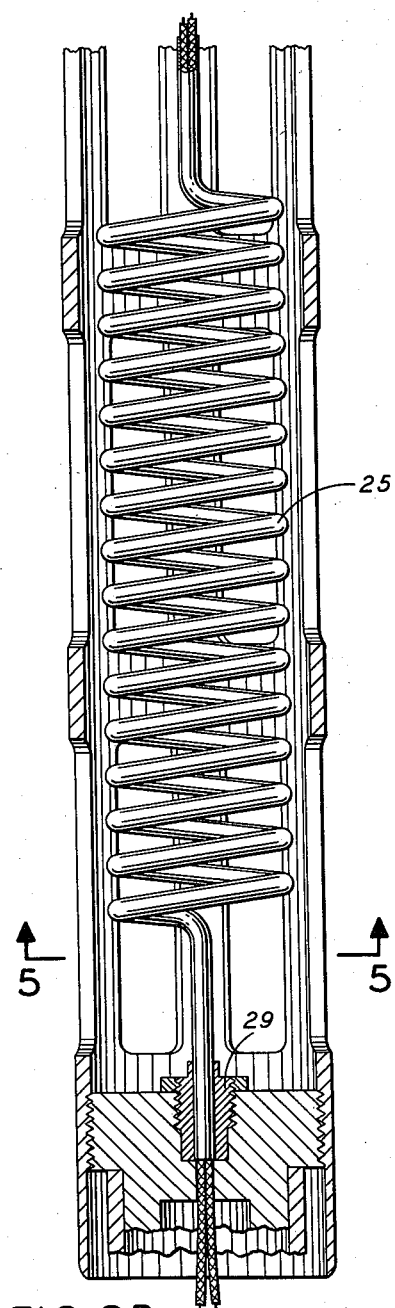

As shown in Fig. 1, a deep well seismometer 7 is supported by a cable break isolator 9 and a steel cable 11 which passes out of the well onto winch pulleys 13 and conductors lead from the seismometer 7 to a recorder 14. The cable break isolator 9 is shown in more detail in Figs. 2A and 2B. Male contacts 15 are provided at its upper end for connection to the cable 11. The contacts 15 are connected to conductors 17 and 19 within the connector plug 21. The conductors 17 and 19 at the back of the conductor plug 21 pass through a rigid hollow steel member 23 to the end of the spring 25. The spring 25 is tightly secured within the screw member 27 within the hollow member 23. The conductors 17 and 19 enter a hollow space within the spring 25, as shown in Fig. 5. The conductors 17 and 19 pass through the spring which is secured at the other end by a second screw member 29, from which it passes into the enclosed part of the seismometer 7.

Figure 3:
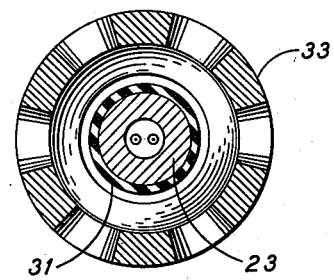
Figs. 3, 4 and 5 are sectional views of the cable break isolator shown in Figs. 2A and 2B.
Figure 4:
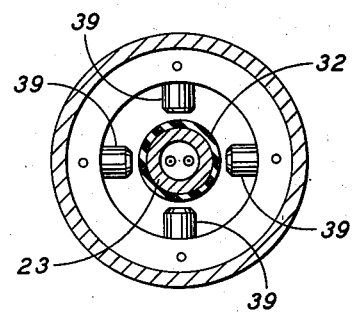

The member 23 shown in Figs. 3 and 4 is sheathed in a rubber coating 31 where it passes through the collar 33. Stops 35 strike against the collar 33 at one end of the movement of the spring 25. The stops 34 strike against the collar 33 and the stops 35 strike against the pins 39 at the other end of the movement of the spring 25. The stops 34 and 35 are useful in the event the seismometer 7 is caught in the well. The stops 35 strike the collar 33 as the seismometer is pulled through a tight place. It may be found desirable to weight the upper end of the isolator 9 in order to make the sonde sink more rapidly in the well while at the same time allowing the seismometer 7 to be light and sensitive. To force the seismometer downward through a bridge, the seismometer is lifted and dropped by releasing the cable 11, permitting the weight to force the stops 34 against the collar 33. Neither is exerting an abnormally severe pull on the seismometer 7, nor, in dropping the sonde, is the spring 25 called to bear the entire force. The conductors 17 and 19 are, accordingly, unaffected.

The rubber coating 31 lies between the steel member 23 and the casing of the geophone 7 and presents a barrier to the transmission of vibrational energy. The rubber sheath 31 protects the member 23 from the collar 33, and the rubber sheath 32 protects the member 23 from the pins 39. Thus, vibrational energy from the cable passes to the seismometer 7 only through the spring 25.

The spring 25 presents complete protection for the conductors 17 and 19 between the supporting cable 11 and the protected inner mechanism of the seismometer 7. Thus, the conductors 17 and 19 are not exposed to well fluids and debris between the cable 11 and the seismometer 7. The conductors 17 and 19 are not subjected to tension nor sliding contact with any parts of the logging tool. The electrical conductors 17 and 19 are therefore fully protected without presenting a hindrance to the proper operation of the cable break isolator.

The above-described geophone isolator is not subject to the faults observed in prior isolators. Isolators which involved a water-tight chamber around a spring and a pair of electrical conductors tended to admit debris which lodged between the coils of the spring and caused the electrical conductors to catch on the spring. When the debris causes the conductor to catch on the spring, the flexure of the spring tends to cause the conductors to break. This breakage results from the fact that the accumulated debris on the spring causes the electrical conductors to be subjected to tension as the coils of the spring vibrate and as the spring is elongated.

The accumulation of debris joining the conductor to the spring is a still more serious problem if the spring and conductors are located in a chamber which is completely exposed to well fluids. My invention, which involves the complete protection of the conductors by the spring, prevents exertion of tension on the conductor and completely isolates the conductors from debris and well fluids. Accordingly, my conductors have a long period of usefulness and do not exert the damping effect which would exist if the conductors were caught on the coils of the spring and subjected to tension.

While my invention has been described with reference to a specific embodiment, I do not intend to limit it except as set forth in the appended claims.

I claim:

1. Means for electrically connecting a recorder on the surface of the ground to a detector within a well comprising a pair of electrical conductors within a cable, a coil spring formed from a resilient hollow tube supporting the detector from the cable, means for extending said electrical conductors through said hollow tube, and means for connecting said electrical conductors at one end to said recorder and at the other end to said detector.

2. The combination comprising an electrical plug adapted to form a mechanical and an electrical connection with a logging cable, a first hollow tube connecting the plug to one end of a coil spring the coils of which are formed from a second hollow tube, a vibration detector connected to the other end of said spring, means forming an enclosed fluid-impervious chamber between the plug and the detector through the said first hollow tube and the said second hollow tube, and a pair of conductors electrically connecting the plug and the detector through said chamber.

3. A logging instrument comprising an electrical plug which is connected to a rigid hollow tube, a resilient hollow tube rigidly affixed to the rigid hollow tube so that a passageway is formed from the plug through the rigid hollow tube into the resilient hollow tube, the resilient hollow tube being coiled in the form of a spring, means joining a detector to the end of the resilient hollow tube to form a passageway from the rigid hollow tube through the resilient hollow tube to the detector, electrical conductors extending from said electrical plug through said passageways to said detector, said resilient hollow tube being adapted to support the weight of said detector and to absorb substantially the entire cable break energy, a collar affixed to the detector, said collar surrounding the resilient hollow tube and forming a ring around the rigid hollow tube slightly larger in diameter than the rigid hollow tube, enlargements on the rigid hollow tube on either side of the collar and so positioned that when the detector is supported by the rigid hollow tube the stops are out of contact with the collar but no appreciable movement of the detector relative to the rigid hollow member may be made without causing the stops to contact the collar.

References Cited in the file of this patent

UNITED STATES PATENTS

| | | |
|---|---|---|
| 2,206,703 | Lowe | July 2, 1940 |
| 2,271,057 | Barrans | Jan. 27, 1942 |
| 2,589,599 | Bond | Mar. 18, 1952 |
| 2,681,442 | Schurman | June 15, 1954 |
| 2,788,510 | Howes | Apr. 9, 1957 |